United States Patent [19]
Flamang et al.

[11] Patent Number: 5,680,793
[45] Date of Patent: Oct. 28, 1997

[54] SERIES OF GEAR UNITS

[75] Inventors: Peter Flamang, Mechlin; Rene Talboom, Kontich, both of Belgium

[73] Assignee: Hansen Transmission International NV, Edgem, Belgium

[21] Appl. No.: 788,202

[22] Filed: Jan. 24, 1997

Related U.S. Application Data

[63] Continuation of Ser. No. 362,445, filed as PCT/EP93/01655, Jun. 29, 1993, abandoned.

[30] Foreign Application Priority Data

Jul. 6, 1992 [EP] European Pat. Off. ............ 92306181

[51] Int. Cl.$^6$ ............................................. F16H 57/02
[52] U.S. Cl. ................... 74/325; 420/421 R; 420/606 R
[58] Field of Search ................... 74/325, 420, 421 R, 74/606 R

[56] References Cited

U.S. PATENT DOCUMENTS

| | | | |
|---|---|---|---|
| 1,894,927 | 1/1933 | Schmitter | 74/606 R |
| 2,600,912 | 6/1952 | Olson | 74/606 R |
| 2,623,406 | 12/1952 | Hansen | 74/606 R |
| 3,001,358 | 12/1961 | Moore | 74/606 R |
| 3,029,661 | 4/1962 | Schmitter | 74/606 R |
| 3,148,556 | 9/1964 | Gibbs et al. | 74/606 R |
| 4,524,638 | 6/1985 | Van Hee | 74/606 R |

FOREIGN PATENT DOCUMENTS

| | | | |
|---|---|---|---|
| 0452739 | 10/1991 | European Pat. Off. | |
| 1932624 | 1/1971 | Germany | |
| 290556 | 6/1991 | Germany | |
| 297839 | 12/1988 | Japan | 74/421 A |
| 673190 | 6/1952 | United Kingdom | |
| 1338610 | 11/1973 | United Kingdom | |

*Primary Examiner*—Rodney H. Bonck
*Assistant Examiner*—Troy Grabow
*Attorney, Agent, or Firm*—Watson Cole Stevens Davis, P.L.L.C.

[57] ABSTRACT

In a series of gear units with increasing torque, each gear unit comprises two or more stages comprising standardized shaft center distances (c, e) and standardized gear wheels (12, 14) and for any stage of given center distance and gear ratio the same intermediate pinion shaft is used systematically in a non-stepped two stage housing and symmetrically stepped three stage housings.

10 Claims, 3 Drawing Sheets

5,680,793

1

SERIES OF GEAR UNITS

This application is a continuation of application Ser. No. 08/362,445, filed Jan. 5, 1995 (abandoned).

BACKGROUND OF THE INVENTION

This invention relates to a series of gear units of the kind in which the series includes gear units of two or more stages and includes gear units providing a range of different torques and ratios. It relates also, but not exclusively, to a series which may include a variety of input and/or output shaft configurations.

Custom built gear units can be provided for all kinds of applications, this with a certain development and production cost. However, the number of variables such as torque, rotating speed, total ratio, number of stages, low speed shaft inclination and option of parallel or right angle shafts hampers the economic production of custom built gear units.

Since the 1950's, it has been known that standardization of housings and rotating parts throughout a catalogued (i.e. predetermined), series of gear units can be very important in achieving required quality at minimized cost by enabling batch production.

For this purpose, GB Patent 673190 showed how the components can be standardised starting from a series of centre distances, which allows e.g. to use a gear set used as a given stage in one size gear unit, as another stage in another size. Another example of standardization of components starting from a series of centre distances is disclosed by U.S. Pat. No. 3,029,661.

In order to be competitive with custom built gear units, an optimal market adequacy of the series has to be aimed at; that is the series needs to include as best as possible a range of different size gear units and different numbers of stages and ratios etc to meet potential customer needs and this must be achieved without adversely affecting manufacturing and related costs. This involves an optimal choice of standardization parameters, such as e.g. torque and ratio ranges and the variety of shaft configurations available in the series.

As an example, GB Patent GB 1338610 shows how such an optimization procedure combines internal economy of the series with high market adequacy.

During the last decades, technical developments have affected the extent to which existing standardizations procedures necessarily produced an optimum balance between the variables available.

The hitherto known standardizations procedures are characterized for example by the requirement for a large number of different pinion shafts, or by requiring housings of different width for a given size of gear unit so as to allow standardizations of high speed pinion shafts. This latter feature does however lead to the need to provide certain shafts of a lower stiffness than may otherwise be desired.

They have been characterized also by a modular housing concept in combination with standardizations of pinion shafts as proposed in DE-OS 1932624 but such modular housings have the disadvantage of requiring machining of many split faces, a need to maintain machining accuracy within small tolerances for split surfaces lying between successive shafts so as to allow for cumulative errors, and a greater assembly effort. Such standardisations also suffer the disadvantage of undesirably restricting the design of the gear units such that in right angle gear units (i.e. in which the input and output shafts are at right angles relative to one another) there is a non-central position of the high speed shaft extension, and of an externally stepped housing restricting access to the high speed shaft in the case of a double shaft which extends out through both sides of the housing.

Another hitherto known standardizations procedure is characterized by a non-modular housing design of internally asymmetrical shape as has been proposed in DD 290556A7. This however has the disadvantage that only gear units with parallel input and output shafts can be provided, and also disadvantages arise from the required unsupported length of the high speed shaft.

More recently it has become increasingly desirable to avoid superfluous machining of material, to provide improved and reliable torque load capabilities without increased production costs and without any reduction of market adequacy of the series.

For example, the evolution of gear technology during at least the past two decades from through-hardened and hobbed to case carburized and ground gears has allowed substantial improvement in the power rating of a pinion or gear component of a given size; this has also contributed to a need potentially to change the hitherto perceived optimum balance.

The present invention seeks to provide a series of gear units incorporating an improved standardizations procedure in which problems associated with known standardizations procedures are mitigated or overcome and which at least in part allows advantageous utilisation of technical developments that affect the design and/or capability of component parts of gear units.

In accordance with one of its aspects the present invention provides a series of gear units with increasing torque of the kind in which each gear unit comprises two or more stages with standardized shaft centre distances and standardized gear wheels where for any stage of given centre distance and gear ratio the same intermediate pinion shaft as hereinafter defined is used systematically in a non-stepped two stage housing and stepped three stage housings which are stepped symmetrically about a plane which extends transversely relative to said pinion shaft.

The term "pinion shaft" is used herein in relation to the present invention to refer to a shaft having a pinion formed integrally therewith.

The term "stepped housing" refers to a housing in which those parts of the housing, referred to as "bearing blocks", which support the gear shaft bearings are stepped, i.e. non-planar, at their inner and outer faces. In contrast a "non-stepped housing" is a housing having bearing blocks which are substantially planar at their inner and outer surfaces such that the pair of bearings provided in the respective bearing blocks to support a shaft are spaced in the direction of the length of the shaft by substantially the same distance for each shaft of the gear unit which extends between those blocks.

The meanings of other terms used in this specification are as follows:

Gear set—the combination of a wheel and pinion which intermesh with one another;

Pinion—component of a gear set with the smaller number of teeth;

Wheel—component of a gear set with the greater number of teeth;

Gear ratio—ratio between the number of teeth of a wheel and of a pinion in a gear set;

Centre distance—distance between the axes of rotation of the pinion and wheel of a gear set;

Gear unit size—a characteristic related to the low speed centre distance or output torque capability of a gear unit;

Bevel gear stage assembly—sub-assembly of bevel gear input pinion shaft or shaft with pinion, bearings, mounting block, and bevel gear;

Internals—sub-assembly of gear components including shafts and bearings contained in a gear housing.

In accordance with a preferred aspect of the present invention the series of gear units is further characterized by the feature that for any high speed stage of given centre distance and gear ratio the same high speed pinion shaft is used systematically in a non-stepped two stage housing and at least one symmetrically stepped three stage housing. The high speed pinion shaft may be of either a single or double extension type, that is it may extend externally of the housing through only one or through both of the bearing blocks.

The series of gear units may comprise pairs of gear units having opposite handing of the shaft extension of at least one of the input and output shafts. The oppositely handed gear units may be gear units of the same size, using the same housing and the internals of one gear unit may be mounted in a manner which is reversed compared with that of the other gear unit so as to provide said opposite handing.

The series of gear units may comprise gear units in which the high speed gear stage is either a characterized cylindrical or characterized bevel gear set. The gear units may comprise housings of a kind adapted to receive and locate a high speed gear stage which is either of a cylindrical or a bevel gear set type.

Each bearing block of a gear unit preferably comprises at least a part which extends continuously (i.e. is not split) between the parallel axes of successive shafts such that said part may serve to dictate the spacing of said shafts.

BRIEF DESCRIPTION OF THE DRAWINGS

Embodiments of the present invention will now be described, by way of example only, with reference to the accompanying drawings in which.

DETAILED DESCRIPTION OF PREFERRED EMBODIMENTS

Figure 1:
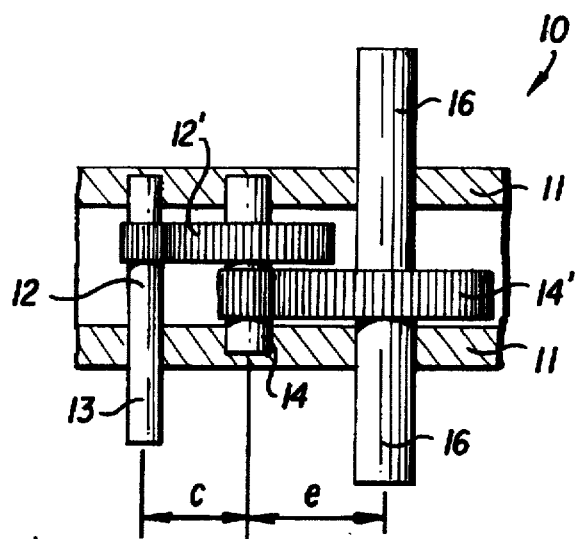
FIGS. 1 to 3 show in cross-section parts of three gear units of a series in accordance with the present invention, being respectively two and three stage units of a first size and a three stage unit of a second, larger size.

Referring to FIG. 1, a two stage gear unit 10 comprises a housing having a pair of non-stepped bearing blocks 11. The blocks 11 are fitted with conventional bearings (not shown) rotatably to support a high speed pinion shaft 12 having a single extension 13, an intermediate pinion shaft 14 which carries a wheel 12' that intermeshes with the pinion shaft 12 and an output shaft 15 having a pair of external extensions 16 and which carries a wheel 14' that intermeshes with the intermediate pinion shaft 14. (The shaft 15 alternatively may have only a single extension).

The centre distances 'c' and 'e' are selected from a standardised series of increasing centre distances a, c, e, g, . . .

Figure 3:
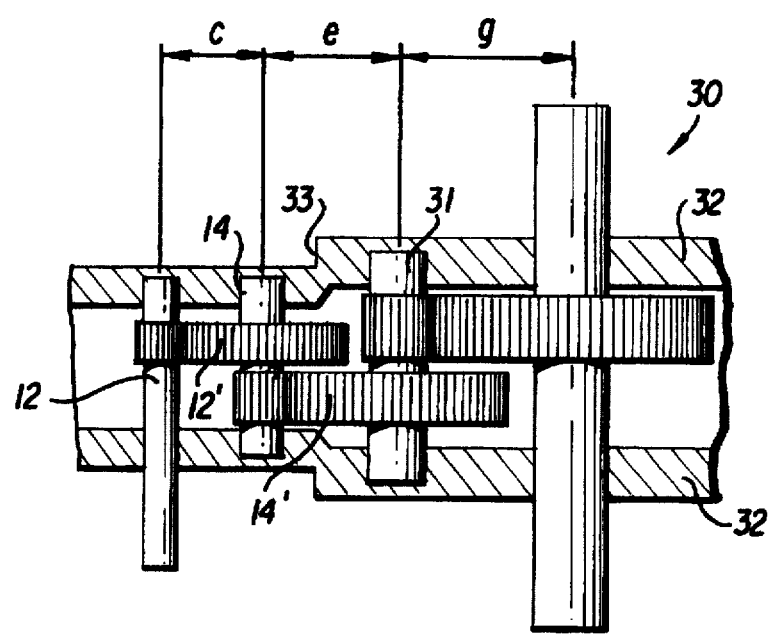

FIG. 3 shows a gear unit 30 of a size larger than that of FIG. 1 and having three stages. The three stages have centre distances 'c', 'e' and 'g'. The high speed stage and intermediate stage have respectively the same centre distances 'c' and 'e' as the corresponding high speed and low speed stages of the two stage gear unit of a smaller size in FIG. 1 and therefore utilise the same shafts 12 and 14 and wheels 12' and 14'.

The housing blocks 32 of FIG. 3 are each of a stepped type, symmetrically arranged, and the shafts 12 and 14 are both located in the narrower region of the housing. Thus the high speed pinion shaft 12 is spaced from the step 33 in each housing block by at least the high speed stage centre distance 'c' so that the external extension 13 (or each extension if the shaft were of the double extension type) is readily available for use over its whole length without interference from the step(s) 33.

In a three stage gear unit 18 (see FIG. 2) of the same size as the gear unit shown in FIG. 1 the same wheel 12', pinion shaft 14, wheel 14' and output shaft 15 are employed for the stages having the corresponding centre distances 'c' and 'e'. The gear unit has a housing 17. The high speed pinion shaft 20 and the intermediate pinion shaft 21 with wheel 20' are additional components and can be utilized for example in a two stage gear unit of a smaller size as is apparent from the previous description of FIG. 3 and comparison thereof with FIG. 1.

Figure 2:
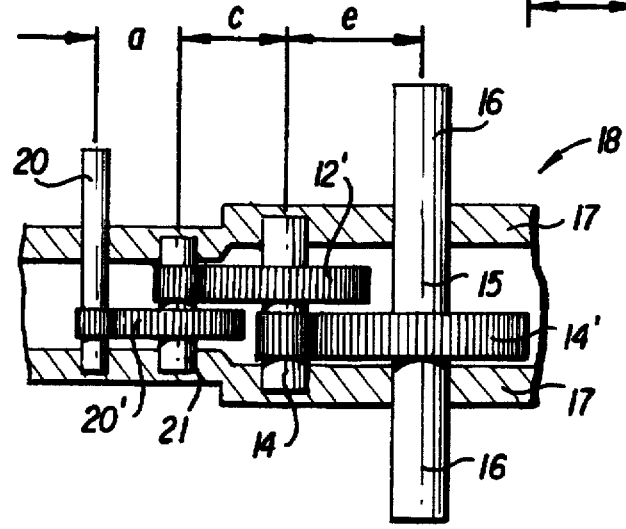
Figure 4:
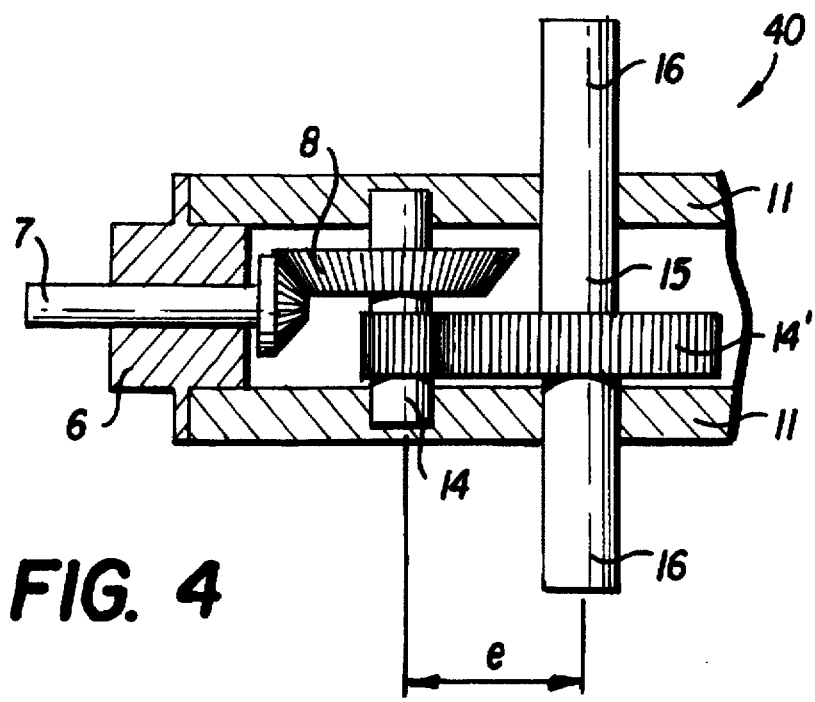
FIGS. 4 and 5 are views in cross-section of parts of another two gear units of a series in accordance with the present invention, being respectively a two stage unit of a first size and a three stage unit of a second, larger size.
Figure 5:
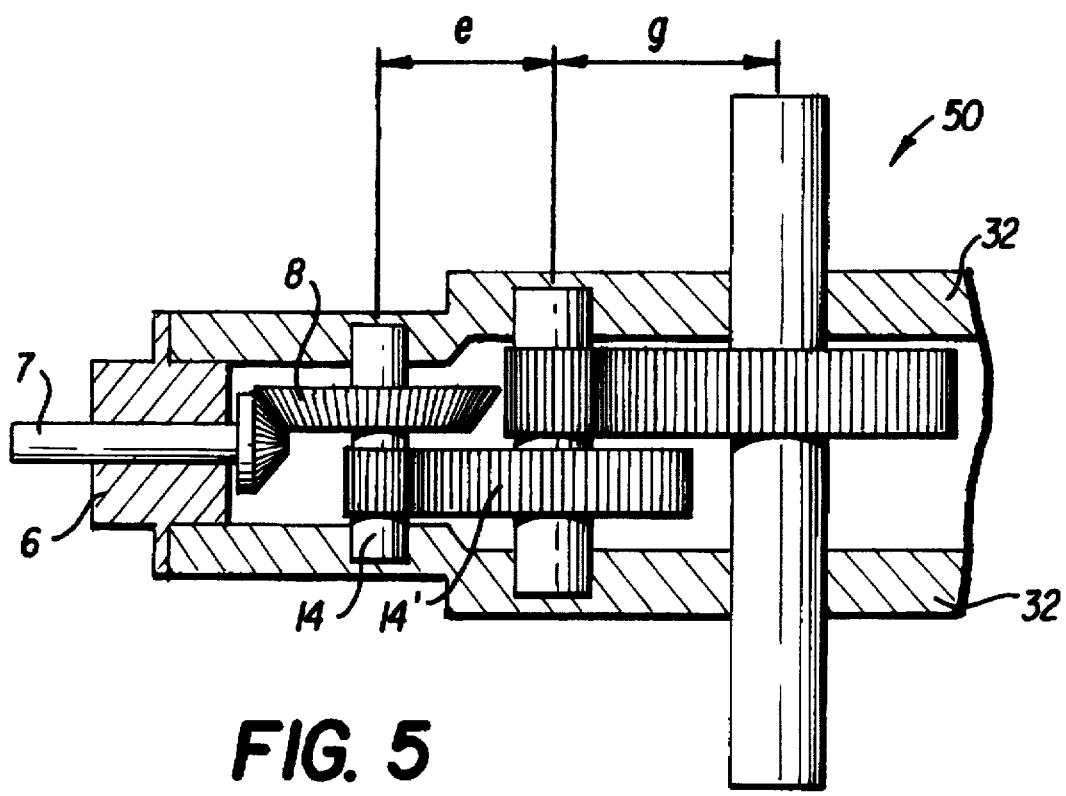

In a second embodiment of the invention as shown in FIGS. 4 and 5 the aforedescribed standardizations aspects of the cylindrical wheels and pinion shafts of FIGS. 1 to 3 are shown applied to a two stage gear unit 40 and larger sized three stage gear unit 50 each having a bevel gear high speed assembly.

Thus, as in the first embodiment a high speed bevel gear input pinion shaft or shaft with pinion 7, mounting block 6, bevel wheel 8 first intermediate pinion shaft 14 and wheel 14' are common to both a two stage gear unit of a first size (size E) and a three stage gear unit of a second, larger size (size G).

By virtue of the symmetrical arrangement of the stepped housings of FIGS. 2, 3 and 5 it will be appreciated that despite standardizations of internals as described above it is possible to obtain an opposite handing of shaft extensions by the simple expedient of selectively reversing the orientation of internals.

Figure 6:
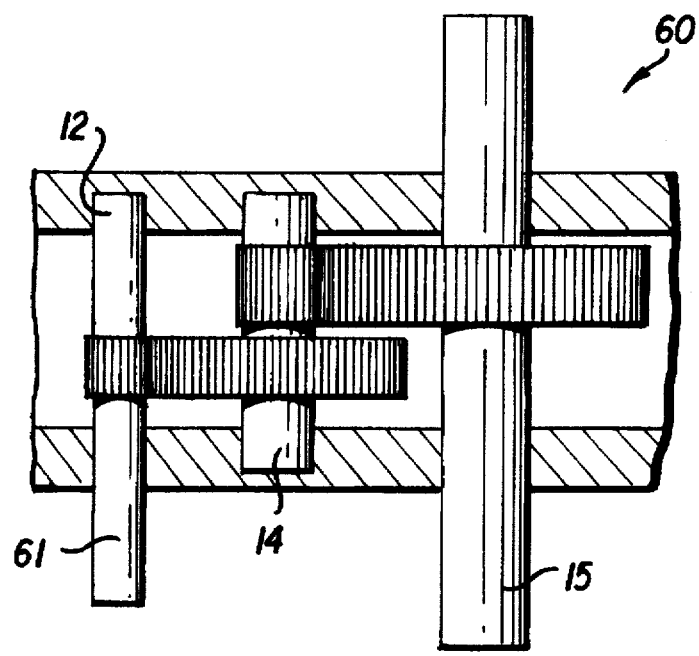
FIG. 6 is a view similar to FIG. 1 but with the gears mounted in a reversed manner.

FIG. 6 shows a gear unit 60 which has the same internals (i.e. high speed pinion shaft 12, intermediate pinion shaft 14 and output shaft 15) as the internals of the gear unit of FIG. 1, but with said internals mounted in a manner which is reversed, and in which the high speed pinion shaft has an extension 61 of opposite handing.

Figure 7:
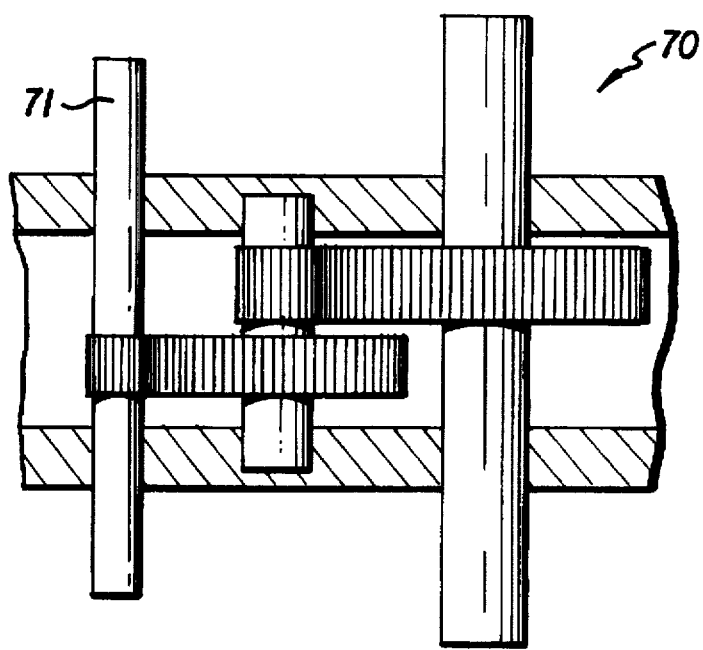
FIG. 7 is a view similar to FIG. 1 but with a double extension high speed pinion shaft.

FIG. 7 shows a gear unit 70 similar to that of FIG. 1 but with a double extension type high speed pinion shaft 71.

The present invention therefore provides high speed and intermediate pinion shafts of adequate stiffness and which are systematically characterized. The invention achieves this in a manner which also allows the provision of bevel gear set assemblies in the same housings and the selective reversal of shaft extensions, in each case the characterized high speed shaft of a three stage gear unit being spaced from the step in the housing so that there is good accessibility for example for coupling devices.

We claim:

1. A series of discrete gear units with increasing torque, wherein each gear unit comprises a housing, an intermediate pinion shaft, and at least two stages within said housing, at least one said housing being a non-stepped two stage housing and at least one said housing being a stepped three stage housing, the series of gear units comprising standardized shaft center distances (a,c,e . . . ) and standardized gear wheels, in which for any stage of given center distance (e) and gear ratio the same size intermediate pinion shaft is in said non-stepped two stage housing and also in said stepped three stage housing, said three stage housing being stepped symmetrically about a plane which extends transversely relative to said pinion shaft.

2. The series of gear units according to claim 1, comprising gear units which each comprise a high speed stage comprising a high speed pinion shaft, in which for any high speed stage of given center distance (c) and gear ratio the same size high speed pinion shaft is in said non-stepped two stage housing and also in said symmetrically stepped three stage housing.

3. The series of gear units according to claim 1 in which two gear units of the series have opposite handing of the shaft extension of at least one of the input and output shafts.

4. The series of gear units according to claim 3, wherein said pairs two gear units are of the same size using the same housing and internals of one gear unit are mounted in a manner which is reversed as compared with that of the other gear unit.

5. The series of gear units according to claim 1, in which the high speed pinion shaft is of the double extension type.

6. The series of gear units according to claim 1, in which the same intermediate or low speed stage can be combined either with a standardized cylindrical gear or a bevel high speed gear stage.

7. The series of gear units according to claim 1, in which at least some gear units of the series comprise housings of a kind adapted to receive and locate a high speed stage which is either of a cylindrical or a bevel gear type.

8. The series of gear units according to claim 1, in which for any high speed bevel gear stage of given size and gear ratio the bevel gear stage assembly present in a non-stepped two stage housing corresponds with the bevel gear stage assembly present in a symmetrically stepped three stage housing.

9. The series of gear units according to claim 1 in which at least one of said housings comprises a bearing block of which at least a part extends between two successive parallel shafts and assists in defining the spacing of said parallel shafts.

10. A plurality of discrete unconnected gear units including a first gear unit and a second gear unit, said first gear unit including a first housing having opposite substantially parallel side walls, a first input shaft, a first output shaft and a first intermediate shaft all being supported by said side walls of the first housing and being drivingly connected to define a first stage torque increase between said input shaft and said intermediate shaft and a second stage torque increase between said intermediate shaft and said output shaft, said shafts defining each stage of said first gear unit having a center distance between the longitudinal axes thereof and having a gear ratio therebetween, said second gear unit including a second housing having opposite side walls, a second input shaft, a second output shaft and a pair of intermediate shafts all being supported by the side walls of said second housing and being drivingly connected to define a first stage torque increase between said input shaft and one of said pair of intermediate shafts, a second stage torque increase between said pair of intermediate shafts and a third stage torque increase between the other of said pair of intermediate shafts and said output shaft, said opposite side walls of the second housing being stepped symmetrically about a plane extending transversely to said second input shaft, said shafts defining each stage of the second gear unit having center distances between the longitudinal axes thereof and having a gear ratio therebetween, said first and second gear units having intermediate shafts of the same size and shape in a stage of the first gear unit which has the same center distance and gear ratio between the shafts defining that stage of the first gear unit as the center distance and gear ratio between the shafts defining a stage of the second gear unit.

* * * * *

UNITED STATES PATENT AND TRADEMARK OFFICE
CERTIFICATE OF CORRECTION

PATENT NO. : 5,680,793
DATED : October 28, 1997
INVENTOR(S) : Peter FLAMANG et al It is certified that error appears in the above-indentified patent and that said Letters Patent is hereby corrected as shown below:

Claim 4, line 2, delete "pairs".

Signed and Sealed this

Twenty-seventh Day of January, 1998

Attest:

BRUCE LEHMAN

Attesting Officer

Commissioner of Patents and Trademarks